(12) United States Patent
Kuckuk et al.

(10) Patent No.: US 11,513,489 B2
(45) Date of Patent: Nov. 29, 2022

(54) SELECTABLE VARIABLE AIR VOLUME CONTROLLER

(71) Applicant: Johnson Controls Technology Company, Milwaukee, WI (US)

(72) Inventors: William R. Kuckuk, Hubertus, WI (US); Christopher J. McCann, West Bend, WI (US); Claude E. Doyle, Jr., Menomonee Falls, WI (US); Brandon A. Sloat, New Berlin, WI (US); Jacob R. Sheahan, Whitelaw, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 72 days.

(21) Appl. No.: 17/080,762

(22) Filed: Oct. 26, 2020

(65) Prior Publication Data

US 2021/0041844 A1     Feb. 11, 2021

Related U.S. Application Data

(63) Continuation of application No. 15/474,407, filed on Mar. 30, 2017, now Pat. No. 10,866,572.

(Continued)

(51) Int. Cl.
| | |
|---|---|
| *G05B 19/048* | (2006.01) |
| *F24F 11/74* | (2018.01) |
| *F24F 11/62* | (2018.01) |
| *F24F 11/30* | (2018.01) |
| *G05B 15/02* | (2006.01) |
| *F24F 11/65* | (2018.01) |

(Continued)

(52) U.S. Cl.
CPC ............ *G05B 19/048* (2013.01); *F24F 11/30* (2018.01); *F24F 11/62* (2018.01); *F24F 11/74* (2018.01); *G05B 15/02* (2013.01); *F24F 11/52* (2018.01); *F24F 11/56* (2018.01); *F24F 11/64* (2018.01); *F24F 11/65* (2018.01); *G05B 2219/2614* (2013.01); *G05B 2219/2642* (2013.01)

(58) Field of Classification Search
CPC .................. G05B 19/048; G05B 15/02; G05B 2219/2614; G05B 2219/2642; F24F 11/30; F24F 11/62; F24F 11/74; F24F 11/52; F24F 11/56; F24F 11/64; F24F 11/65
See application file for complete search history.

(56) References Cited

U.S. PATENT DOCUMENTS

| | | |
|---|---|---|
| 4,947,928 A | 8/1990 | Parker et al. |
| 8,396,604 B2 | 3/2013 | Imes et al. |

(Continued)

OTHER PUBLICATIONS

"Single-Path Multiple-Zone System Design by Dennis Stanke dated Jan. 2005".*

(Continued)

*Primary Examiner* — Ziaul Karim
(74) *Attorney, Agent, or Firm* — Foley & Lardner LLP

(57) ABSTRACT

A variable air volume controller includes a communications interface and a processing circuit. The communications interface is configured to facilitate communication with an external device and building equipment. The processing circuit is configured to store a plurality of predefined, selectable-applications; receive a selection of one of the plurality of predefined, selectable-applications; and implement the selected application such that the building equipment is controlled according to the selected application.

17 Claims, 8 Drawing Sheets

Related U.S. Application Data

(60) Provisional application No. 62/328,587, filed on Apr. 27, 2016.

(51) Int. Cl.
*F24F 11/52* (2018.01)
*F24F 11/64* (2018.01)
*F24F 11/56* (2018.01)

(56) References Cited

U.S. PATENT DOCUMENTS

| | | | |
|---|---|---|---|
| 9,958,291 B1 | 5/2018 | Shunturov et al. | |
| 2007/0013532 A1 | 1/2007 | Ehlers | |
| 2007/0043478 A1* | 2/2007 | Ehlers | F24F 11/30 700/276 |
| 2007/0213880 A1 | 9/2007 | Ehlers | |
| 2007/0220907 A1 | 9/2007 | Ehlers | |
| 2009/0057428 A1 | 3/2009 | Geadelmann et al. | |
| 2011/0088000 A1* | 4/2011 | Mackay | H04L 12/2823 715/853 |
| 2011/0166712 A1 | 7/2011 | Kramer et al. | |
| 2012/0046589 A1 | 2/2012 | Eckstein et al. | |
| 2012/0064923 A1* | 3/2012 | Imes | H02J 13/00028 455/457 |
| 2012/0135759 A1 | 5/2012 | Imes et al. | |
| 2013/0018850 A1* | 1/2013 | Houlihan | G06F 16/212 707/690 |
| 2014/0045482 A1 | 2/2014 | Bisson et al. | |
| 2014/0277788 A1* | 9/2014 | Forbes, Jr. | H02J 13/00017 700/286 |
| 2016/0178226 A1* | 6/2016 | Daubman | H04W 4/02 700/278 |
| 2017/0254553 A1 | 9/2017 | Leal et al. | |

OTHER PUBLICATIONS

VAV Controller—The Perfect Package | Neptronic; https://neptronic.wordpress.com/2013/09/16/vav-controller-the-prefect-package/; dated Sep. 16, 2013 (2 pages).

* cited by examiner

SELECTABLE VARIABLE AIR VOLUME CONTROLLER

CROSS-REFERENCE TO RELATED PATENT APPLICATION

This application is a continuation application of U.S. patent application Ser. No. 15/474,407 filed Mar. 30, 2017 which claims the benefit of U.S. Provisional Patent Application No. 62/328,587, filed Apr. 27, 2016, both of which are incorporated herein by reference in their entireties.

BACKGROUND

The present disclosure relates generally to the field of variable air volume controllers. A variable air volume (VAV) controller is, in general, a controller configured to control, monitor, and manage equipment of an HVAC system in or around a building or building area.

SUMMARY

One implementation of the present disclosure is related to a variable air volume controller. The variable air volume controller includes a communications interface and a processing circuit. The communications interface is configured to facilitate communication with an external device and building equipment. The processing circuit is configured to store a plurality of predefined, selectable-applications; receive a selection of one of the plurality of predefined, selectable-applications; and implement the selected application such that the building equipment is controlled according to the selected application.

Another implementation of the present disclosure is related to a building management system. The building management system includes building equipment and a controller coupled to the building equipment. The controller is configured to store a plurality of predefined, selectable-applications; receive a selection of one of the plurality of predefined, selectable-applications; and implement the selected application such that the building equipment is controlled according to the selected application.

Still another implementation of the present disclosure is related to a variable air volume controller. The variable air volume controller includes a communications interface and a processing circuit. The communications interface is configured to facilitate communication with at least one of an external device and building equipment. The processing circuit is configured to store a super-application including a plurality of sub-applications and activate one or more of the sub-applications based on at least one of (i) receiving configuration settings from the external device and (ii) automatically detecting a type of the building equipment connected therewith.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESILICON CONTROLLED RECTIFIERIPTION OF THE DRAWINGS

DETAILED DESILICON CONTROLLED RECTIFIERIPTION

Building Management System and HVAC System

Figure 1:
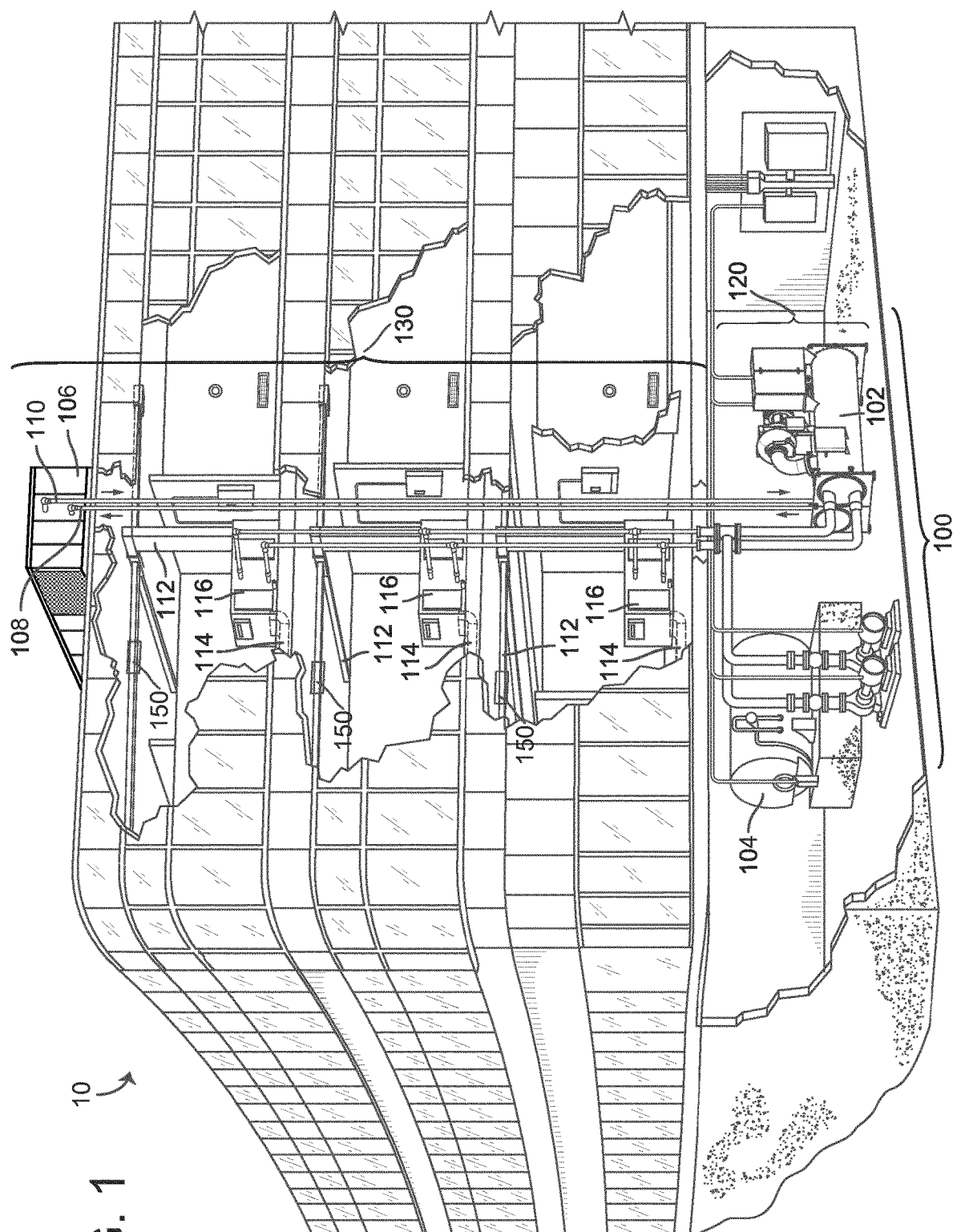
FIG. 1 is a drawing of a building equipped with a building management system (BMS) and a HVAC system, according to some embodiments.

Referring now to FIGS. 1-4, an exemplary building management system (BMS) and HVAC system in which a VAV controller of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (RTU) 106. Waterside system 120 can use boiler 104 and chiller 102 to heat or cool a working fluid (e.g., water, glycol, etc.) and can circulate the working fluid to RTU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to RTU 106 via piping 108.

RTU 106 can place the working fluid in a heat exchange relationship with an airflow passing through RTU 106 (e.g., via one or more stages of cooling coils and/or heating coils). The airflow can be, for example, outside air, return air from within building 10, or a combination of both. RTU 106 can transfer heat between the airflow and the working fluid to provide heating or cooling for the airflow. For example, RTU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by RTU 106 (i.e., the supply airflow) to building 10 via air supply ducts 112 and can provide return air from building 10 to RTU 106 via air return ducts 114. In some embodiments, airside system 130 includes multiple local air handling units (AHUs) 116 positioned within building 10. The AHUs 116 may include various components similar to the RTU 106. In some embodiments, the airside system 130 includes variable air volume (VAV) units 150. For example, airside system 130 is shown to include a separate VAV unit 150 on each floor or zone of building 10. VAV units 150 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 150 or other flow control elements. RTU 106 and/or AHUs 116 can include various sensors (e.g., temperature sensors, pressure sensors, etc.) configured to measure attributes of the supply airflow. RTU 106 and/or AHUs 116 can receive input from sensors located within RTU 106 and/or AHUs 116 and/or within the building zone and can adjust the flow rate, temperature, or other attributes of the supply airflow through RTU 106 and/or AHUs 116 to achieve setpoint conditions for the building zone.

Figure 2:
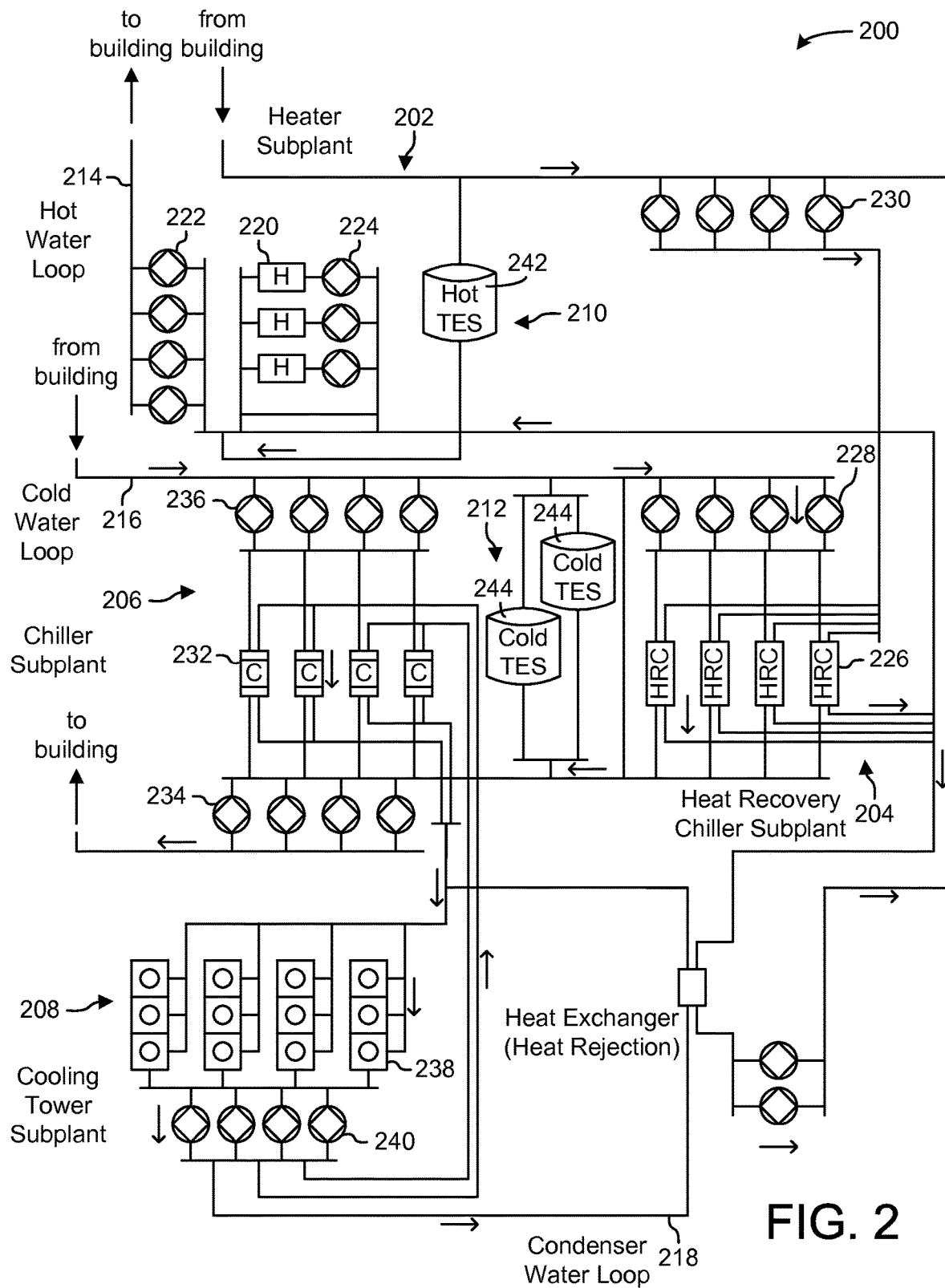
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to RTU 106 and/or AHUs 116. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., RTU 106) or to individual floors or zones of building 10 (e.g., AHUs 116, VAV units 150). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
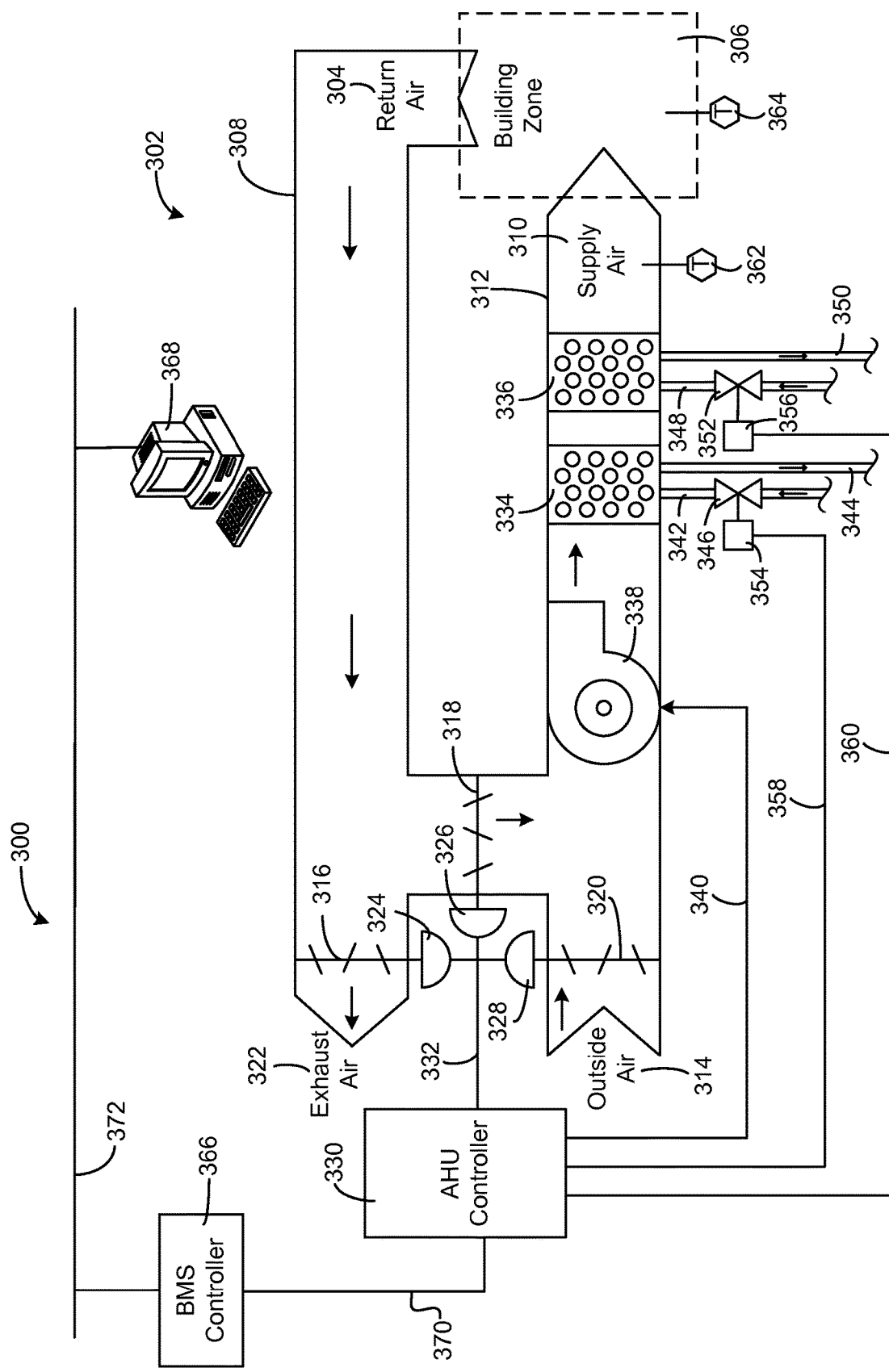
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., RTU 106, AHUs 116, VAV units 150, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., RTU 106 as shown in FIG. 1) or otherwise positioned to receive both return air 304 and outside air 314 (e.g., AHUs 116 as shown in FIG. 1). AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
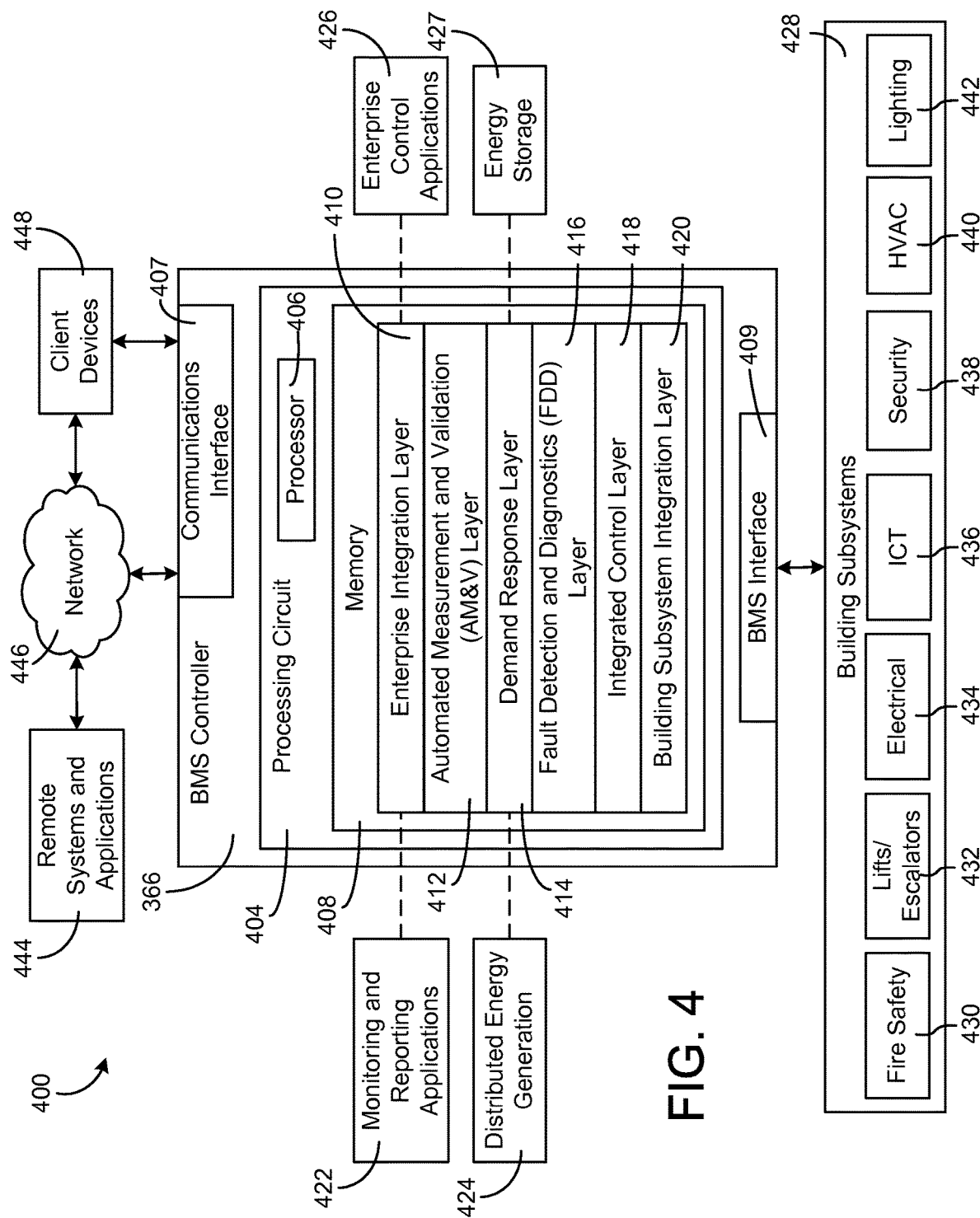
FIG. 4 is a block diagram of a Building Management System (BMS) which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers (e.g., VAV controllers, etc.), supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Variable Air Volume Controller

Referring now to FIGS. 5-8, a controller, shown as variable air volume field (VAV) controller 500, and various programmer devices 530 are shown, according to various exemplary embodiments. In some embodiments, VAV controller 500 is configurable, but not fully programmable. In alternative embodiments, the VAV controller 500 is fully programmable. VAV controller 500 may be usable with BMS 400. Traditional VAV field controllers may be fully programmable, making them very flexible. However, this flexibility may also make them complex to use. A complex tool (e.g., a Controller Configuration Tool (CCT), a Programmable Configuration Tool (PCT), a personal computer based tool, etc.) is often required to build desired applications for the VAV field controllers to operate various building equipment (e.g., HVAC systems and equipment thereof, etc.). This programmability also requires (i) time to build the applications, (ii) time to customize the applications as needed, (iii) time to download the applications to the VAV field controllers from the complex tool on a job site, and (iv) time to test and verify any customizations made to the applications. All this time to program traditional VAV field controllers costs money, which may be saved by using one or more pre-defined, pre-loaded applications on the VAV controller 500 (e.g., rather than custom building the applications each time, etc.). In some embodiments, the controller is structured as another type of controller other than a VAV controller (e.g., an air handling unit controller, a fan coil unit controller, etc.).

Figure 5:
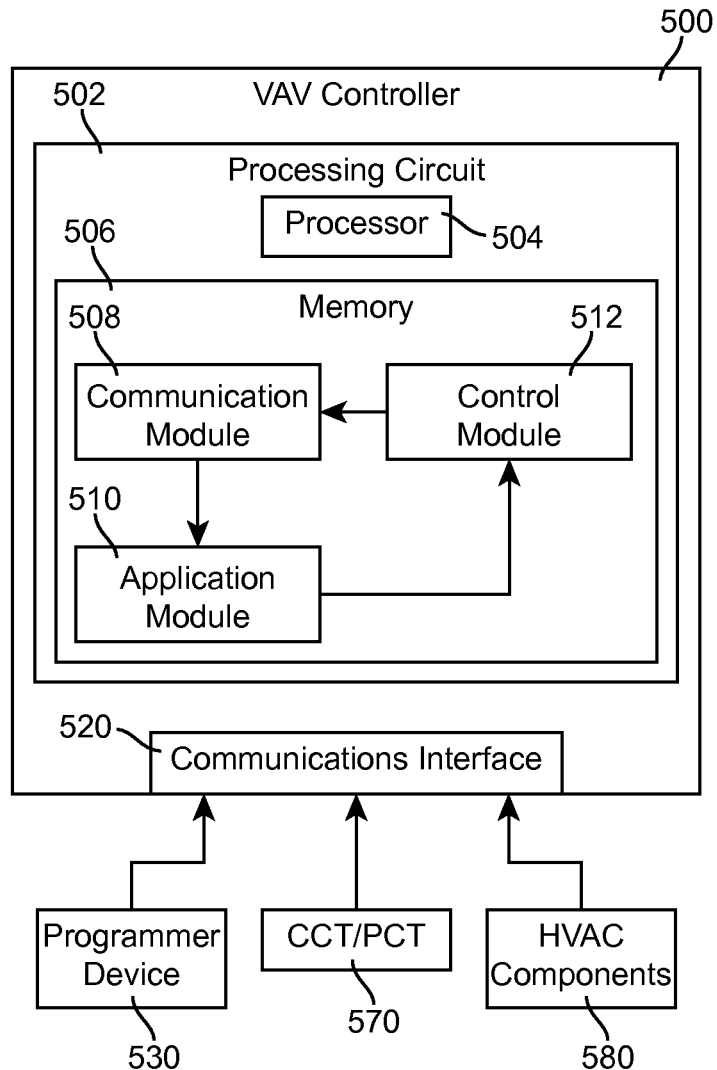
FIG. 5 is a block diagram of a VAV controller, according to some embodiments.

As shown in FIG. 5, the VAV controller 500 includes a communications interface 520. The communications interface 520 may include wired or wireless interfaces (e.g., jacks, antennas, transmitters, receivers, transceivers, wire terminals, etc.) for conducting data communications with various systems, devices, or networks. For example, the communications interface 520 may include an Ethernet card and port for sending and receiving data via an Ethernet-based communications network and/or a WiFi transceiver for communicating via a wireless communications network. The communications interface 520 may be configured to communicate via local area networks or wide area networks (e.g., the Internet, a building WAN, etc.) and may use a variety of communications protocols (e.g., BACnet, IP, LON, Bluetooth, ZigBee, radio, cellular, etc.).

The communications interface 520 of the VAV controller 500 may facilitate communicating with a programmer device 530, a CCT/PCT device 570, and/or HVAC components 580 (e.g., building equipment similar to the components of HVAC system 100, airside system 300, etc.). Communication between and among the VAV controller 500 and the programmer device 530, the CCT/PCT device 570, and/or the HVAC components 580 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, BACnet, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

According to an exemplary embodiment, the VAV controller 500 is a selectable VAV controller for VAV box applications, and does not require any software tools (e.g., a CCT, a PCT, etc.) to initiate the proper sequence of operation to control the HVAC components 580. By way of example, a plurality of predefined applications (e.g., twenty, fifteen, twenty-five, etc.) may be downloaded and stored within a memory of the VAV controller 500 (e.g., by the manufacturer, to cover over 90% of all possible system configurations, etc.). A desired application may then be selected in the field from the plurality of predefined applications using the programmer device 530 (e.g., a portable device, a smartphone, a tablet, a laptop, a VAV Balancing Tool, etc.). In addition to selecting the desired application, the programmer device 530 may be configured to facilitate changing application parameters. Having a desired application selected in the field without the need for a software tool (e.g., the CCT/PCT device 570, etc.) may result in improved workflows and a significant installation cost savings opportunity. Additionally, this may allow the installer to select the field-selectable application, thus allowing technicians to work on other, more value-added activities. Additional applications, beyond the plurality of applications that are predefined within the memory of the VAV controller 500, may be added via the CCT/PCT device 570 (e.g., for cases where the plurality of predefined applications do not meet the field requirement, etc.).

As shown in FIG. 5, the function and structure of the VAV controller 500 is shown according to an example embodiment. The VAV controller 500 is shown to include a processing circuit 502 including a processor 504 and a memory 506. The processor 504 may be implemented as a general-purpose processor, an application specific integrated circuit (ASIC), one or more field programmable gate arrays (FPGAs), a digital signal processor (DSP), a group of processing components, or other suitable electronic processing components. The memory 506 (e.g., NVRAM, RAM, ROM, Flash Memory, hard disk storage, etc.) may store data and/or computer code for facilitating the various processes described herein. Thus, the memory 506 may be communicably connected to the processor 504 and provide computer code or instructions to the processor 504 for executing the processes described in regard to the VAV controller 500 herein. Moreover, the memory 506 may be or include tangible, non-transient volatile memory or non-volatile memory. Accordingly, the memory 506 may include database components, object code components, script components, or any other type of information structure for supporting the various activities and information structures described herein.

The memory 506 is shown to include various modules for completing the activities described herein. More particularly, the memory 506 includes a communication module 508, an application module 510, and a control module 512. The modules 508-512 may be configured to receive a selection of an application of the VAV controller 500 to implement to facilitate controlling operation of various building components (e.g., HVAC system components, etc.). While various modules with particular functionality are shown in FIG. 5, it should be understood that the VAV controller 500 and the memory 506 may include any number of modules for completing the functions described herein. For example, the activities of multiple modules may be combined as a single module, as additional modules with additional functionality may be included, etc. Further, it should be understood that the VAV controller 500 may further control other activity beyond the scope of the present disclosure.

The communications module 508 may be configured to send and receive information (e.g., data, commands, etc.) between the VAV controller 500 and the programmer device 530, the CCT/PCT device 570, and/or the HVAC components 580. Thus, the communication module 508 may be communicably and/or operatively coupled with the communications interface 520. In some embodiments, the communications module 508 is configured to facilitate receiving an application selection from the programmer device 530. The communications module 508 may then transmit the application selection to the application module 510 to take further action, as described further herein. In some embodiments, the communication module 508 is configured to receive a series of field configuration settings to facilitate configuring a stored application within the application module 510. In some embodiments, the communications module 508 is configured to facilitate receiving a custom application from the CCT/PCT device 570. The communications module 508 may then transmit the custom application to the application module 510 to take further action, as described further herein. In some embodiments, the communications module 508 is configured to facilitate receiving one or more modifications for an application stored within the application module 510. In some embodiments, the communication module 508 is configured to receive commands from the control module 512 and transmit such commands to the HVAC components 580 to initiate proper operation of the HVAC components, as describe further herein.

The application module 510 may be configured to receive and store the plurality of predefined applications. In some embodiments, the application module 510 is configured to receive and store a super-application configured to facilitate controlling a plurality of components and arrangements of the HVAC components 580. The super-application may be customized through a series of field configuration settings inputted via the programmer device 530 (e.g., based on the type of application, etc.) and/or automatically based on information received from HVAC components 580 (e.g., detecting which equipment the VAV controller 500 is connected to, etc.). The application module 510 may be configured to activate and/or deactivate certain portions of the super-application (e.g., sub-applications thereof, etc.) based on (i) the field configuration setting received from the programmer device 530 (i.e., based on a manual user input) and/or (ii) based on the detected building equipment (i.e., automatically).

In some embodiments, the application module 510 is additionally or alternatively configured to receive and store a plurality of individual, predefined applications. According to an exemplary embodiment, the plurality of individual, predefined applications include selectable-applications that are relatively simple and more focused on a specific implementation (e.g., relative to the super-application, control of a specific component or portion of the HVAC components 580, etc.). This may allow for a plurality of pre-loaded applications to be stored within the application module 510, covering a majority (e.g., 90%, etc.) of all implementations. An additional benefit of the selectable-application approach is that the set of predefined applications may be easily tailored for specific customers (e.g., OEMs, etc.) or markets. Using smaller, selectable applications may also allow for increased performance of the HVAC components 580 (e.g., since a selected application is designed to operate for a single implementation, etc.) and a reduction in possible issues within the source code of the application (e.g., relative to a custom-built application, relative to a super-application, etc.).

An example of possible selectable-applications stored within the application module 510 is shown in Table 1. The applications shown in Table 1 may apply to single duct applications (e.g., no fan, etc.), fan applications, and/or dual duct/exhaust box applications. It should be noted that the applications of Table 1 are provided for example, and should not be considered as limiting as other applications may be possible.

TABLE 1

Possible Selectable-Applications

| Configurable Controller | App # | Box | Fan | Description |
|---|---|---|---|---|
| Single Duct | 1 | Single Duct | No Fan | Single Duct - Cooling Only |
| Single Duct | 2 | Single Duct | No Fan | Single Duct with HW Reheat |
| Single Duct | 3 | Single Duct | No Fan | Single Duct with Electric Staged Reheat |
| Single Duct | 4 | Single Duct | No Fan | Single Duct with HW Reheat & Supplemental Heat |
| Fan | 5 | Single Duct | Series Fan Single Speed | Series Fan with HW Reheat |
| Fan | 6 | Single Duct | Parallel Fan | Parallel Fan with HW Reheat |
| Fan | 7 | Single Duct | Series Fan Single Speed | Series Fan with HW Reheat & Supplemental Heat |
| Fan | 8 | Single Duct | Parallel Fan | Parallel Fan with HW Reheat & Supplemental Heat |
| Fan | 9 | Single Duct | Series Fan Single Speed | Series Fan with Electric Staged Reheat |
| Fan | 10 | Single Duct | Parallel Fan | Parallel Fan with Electric Staged Reheat |
| Fan | 11 | Single Duct | Series Fan Single Speed | Series Fan No Heat |
| Fan | 12 | Single Duct | Parallel Fan | Parallel Fan No Heat |
| Fan | 13 | Single Duct | Series Fan Variable Speed | Series Fan with Remote ECM |
| Fan | 14 | Single Duct | Series Fan Variable Speed | Series Fan with Remote HW & HW Reheat |
| Fan | 15 | Single Duct | Series Fan Variable Speed | Series Fan with Remote ECM, HW Reheat & Supplemental Heat |
| Fan | 16 | Single Duct | Series Fan Variable Speed | Series Fan with Remote ECM & Electric Reheat |
| Single Duct | 17 | Single Duct | No Fan | Single Duct with SCR Electric Reheat |
| Fan | 18 | Single Duct | Series Fan Single Speed | Series Fan with SCR Electric Reheat |
| Fan | 19 | Single Duct | Series Fan Variable Speed | Series Fan with Remote ECM & SCR Electric Reheat |
| Fan | 20 | Single Duct | Parallel Fan | Parallel Fan with SCR Electric Reheat |
| Dual Duct Exhaust | 21 | Dual Duct | No Fan | Dual Duct with Mixing |
| Dual Duct Exhaust | 22 | Dual Duct | No Fan | Dual Duct Constant Volume |
| Dual Duct Exhaust | 23 | Exhaust Damper | No Fan | Supply/Exhaust Matching (Supply Box) |

In some embodiments, application module 510 is configured to store metadata that is shared between each of the selectable-applications. By way of example, all the metadata used by VAV controller 500 may be stored by application module 510 in a shared portion of memory 506. The shared portion of memory 506 may be accessible by each of the selectable-applications. According to an exemplary embodiment, such an arrangement facilitates providing VAV controller 500 with a smaller memory 506 relative to if metadata was segmented and stored individually for each of the selectable-applications.

In some embodiments, the application module 510 is configured to facilitate receiving and storing custom applications generated by a user via the CCT/PCT device 570. The user may select to overwrite one or more of the predefined applications with the custom application or store the custom application without overwriting any of the predefined applications (e.g., if there is available free memory, etc.). In some embodiments, a user is able to upload, download, commission, and/or modify one or more of the selectable-applications via the CCT/PCT device 570 to create a custom application within the application module 510.

According to an exemplary embodiment, an application stored within the application module 510 may be selected (i) locally from a balancing tool, (ii) locally from a mobile access portal (MAP) (e.g., using a mobile device, etc.), (iii) locally using a user interface (e.g., dip switches, display, etc.) of VAV controller 500, and/or (iv) remotely (e.g., from a network automation engine (NAE) via a BACnet point, etc.).

Figure 6:
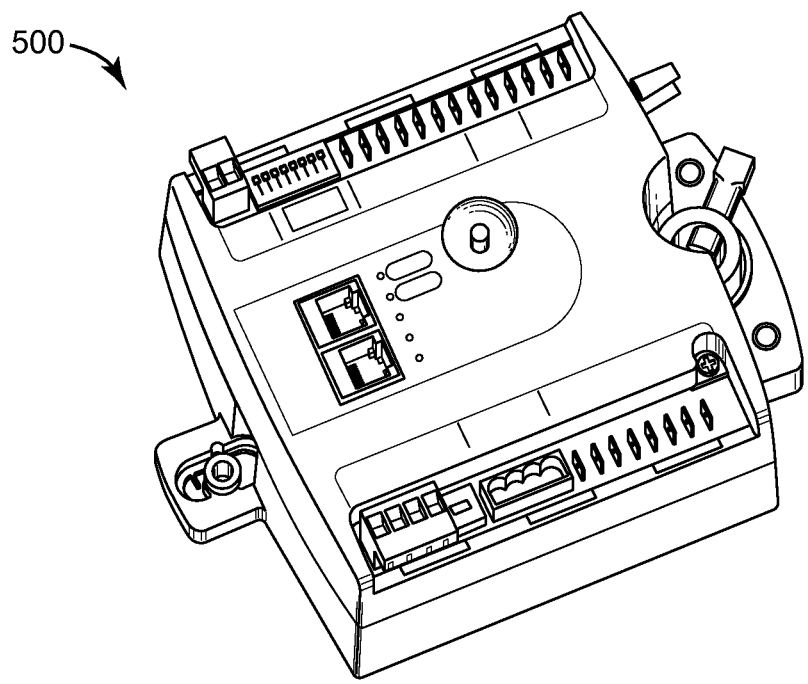
FIG. 6 is an illustration of communication between the VAV controller of FIG. 5 and a balancing tool, according to some embodiments.
Figure 6:
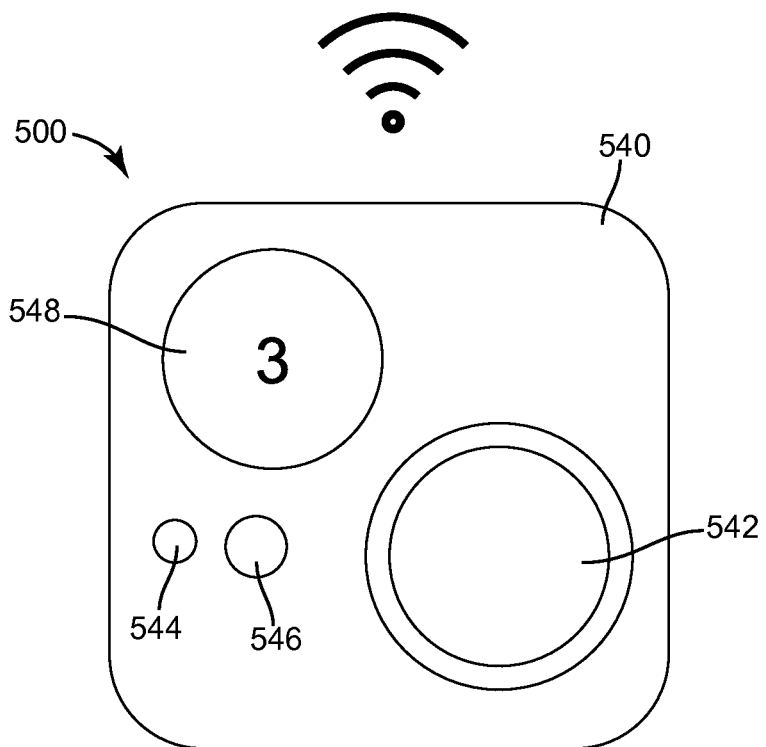
Figure 7A:
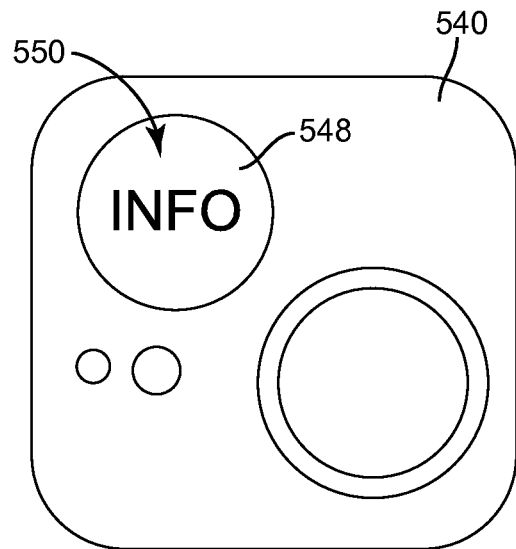
FIGS. 7A-7D are various illustrations of graphical user interfaces (GUIs) of the balancing tool of FIG. 6, according to some embodiments.
Figure 7B:
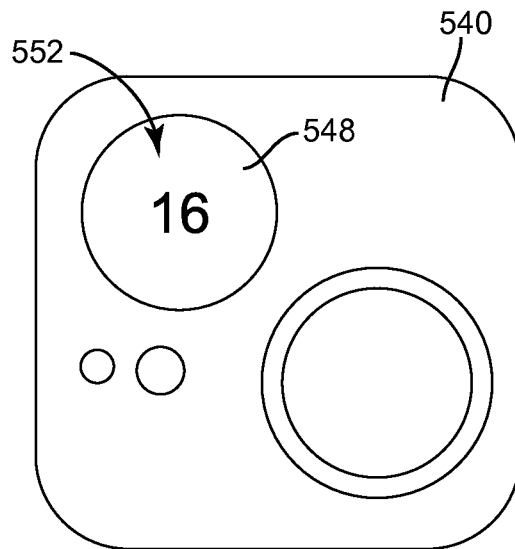
Figure 7C:
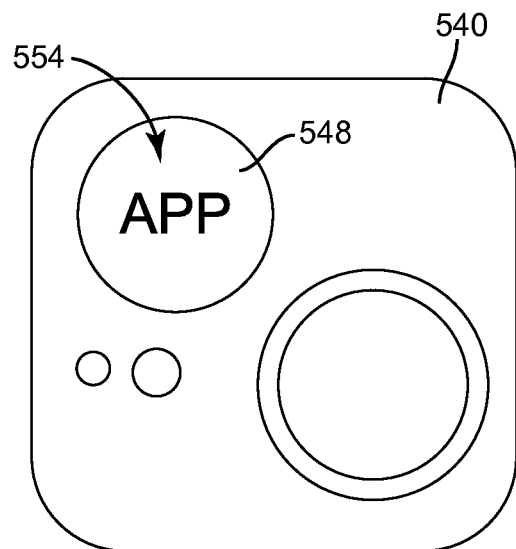
Figure 7D:
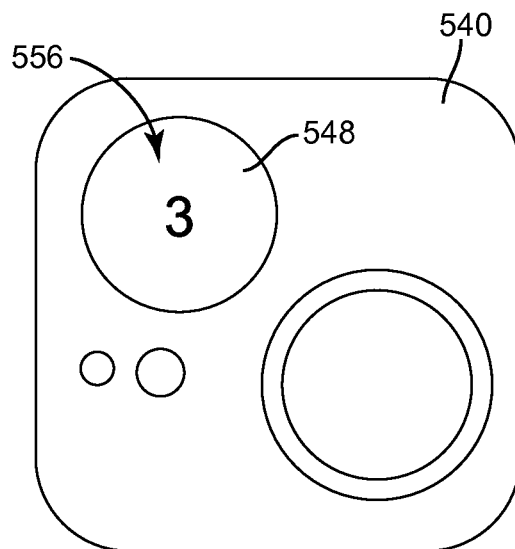

As shown in FIGS. 6-7D, the programmer device 530 includes a balancing tool 540. According to an exemplary embodiment, the balancing tool 540 is configured to facilitate selecting an application from the plurality of pre-defined applications of the VAV controller 500. In other embodiments, the balancing tool 540 is configured to facilitate configuring the super-application of the VAV controller 500.

As shown in FIG. 6, the balancing tool 540 includes a dial 542, an enter button 544, a cancel/back button 546, and a display 548. The dial 542 may be configured to facilitate scrolling between various user interfaces of the balancing tool 540. The enter button 544 may be configured to facilitate selecting a desired user interface and/or selecting a desired application from the predefined applications. The cancel/back button 246 may be configured to facilitate moving back to a previous user-interface and/or canceling a current command. The display 548 may be configured to display the various user interfaces.

As shown in FIGS. 7A-7D, an application of the VAV controller 500 may be selected via the balancing tool 540. As shown in FIG. 7A, a user may adjust dial 542 to reach an info user interface 550 on the display 548. By selecting the info user interface 550 (e.g., via the enter button 544, etc.), the display 548 of the balancing tool 540 displays a MSTP interface 552 (FIG. 7B) to provide the Master-Slave/Token-Passing (MSTP) address of the VAV controller 500. As shown in FIG. 7C, the user may adjust dial 542 to reach an application user interface 554 on the display 548. By selecting the application user interface 554 (e.g., via the enter button 544, etc.), the display 548 of the balancing tool 540 displays an application selection interface 556 (FIG. 7D). The application selection interface 556 is configured to display an identifier (e.g., a number, etc.) associated with the stored selectable-applications. The user may scroll through the various identifiers with the dial 542 and select a desired application with the enter button 544.

Figure 8:
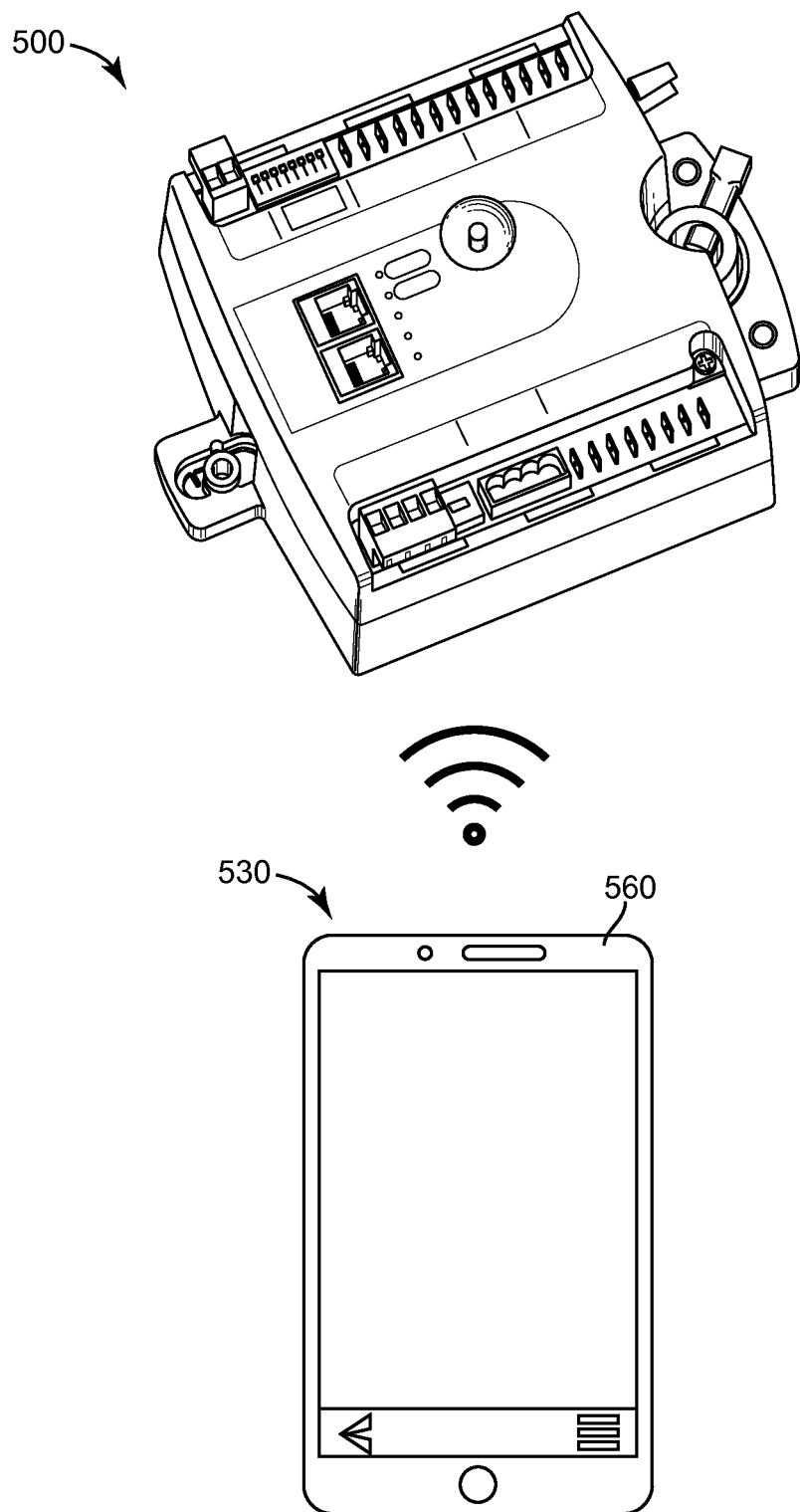
FIG. 8 is an illustration of communication between the VAV controller of FIG. 5 and a mobile device, according to some embodiments.

As shown in FIG. 8, the programmer device 530 includes a mobile device 560 (e.g., a smartphone, a tablet, a laptop, a PDA, etc.). According to an exemplary embodiment, the mobile device 560 is configured to facilitate selecting an application from the plurality of pre-defined applications of the VAV controller 500. In other embodiments, the mobile device 560 is configured to facilitate configuring the super-application of the VAV controller 500.

In some embodiments, a user interface of VAV controller 500 is configured to facilitate selecting an application from the plurality of pre-defined applications of VAV controller 500. In other embodiments, the user interface of VAV controller 500 is configured to facilitate configuring the super-application of VAV controller 500. By way of example, the user interface of VAV controller 500 may include a plurality of switches, e.g., dip switches, used to provide an input directly to VAV controller 500 to indicate which of the pre-defined applications to implement and/or to reconfigure the super-application (e.g., activate/deactivate certain sub-applications, etc.). By way of another example, the user interface of VAV controller 500 may include a display, buttons, knobs, switches, etc. that facilitate providing an input directly to VAV controller 500 to indicate which of the pre-defined applications to implement and/or to reconfigure the super-application.

Referring back to FIG. 5, the control module 512 is configured to clear the configuration data file, reset the VAV controller 500, and use the newly selected application during its normal startup sequence when a new application is selected via the programmer device 530. Thus, the control module 512 may be configured to initiate the proper sequence of operation to control the HVAC components 580. The control module 512 may thereby send commands to the HVAC components 580 according to the selected application via the communication module 508.

Therefore, the VAV controller 500 provides a configurable controller for direct and indirect channels that does not require any software tools (e.g., the CCT/PCT device 570, etc.) to initiate a proper sequence of operation. Therefore, the VAV controller 500, once leaving the manufacturing facility, is a "configurable" controller and does not require that the applications be built on-site. The VAV Controller 500 may thereby provide multiple benefits including simplified workflows and installation cost savings (e.g., relative to traditional, fully programmable VAV field controllers, etc.). For example, the VAV Controller 500 may save (i) the time previously spent building the applications, (ii) the time previously spent customizing the applications based on the implementation, (iii) the time spent downloading the applications to the VAV field controllers from the complex tool on a job site, and (iv) the time previously spent testing and verifying any customizations made to the applications.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A variable air volume controller, comprising:
a communications interface configured to facilitate communication with at least one of an external device and building equipment;
a processing circuit configured to:
store a plurality of predefined, selectable-applications;
receive a selection of one of the plurality of predefined, selectable-applications, wherein the plurality of predefined, selectable-applications comprise at least two of a single duct—cooling only, single duct with hot water reheat, single duct with electric staged reheat, single duct with hot water reheat & supplemental heat, series fan with hot water reheat, parallel fan with hot water reheat, series fan with hot water reheat & supplemental heat, parallel fan with hot water reheat & supplemental heat, series fan with electric staged reheat, parallel fan with electric staged reheat, series fan no heat, parallel fan no heat, series fan with remote electronically controlled motor, series fan with remote electronically controlled motor & hot water reheat, series fan with remote electronically controlled motor, hot water reheat & supplemental heat, series fan with remote electronically controlled motor & electric reheat, single duct with silicon controlled rectifier electric reheat, series fan with silicon controlled rectifier electric reheat, series fan with remote electronically controlled motor & silicon controlled rectifier electric reheat, parallel fan with silicon controlled rectifier electric reheat, dual duct with mixing, dual duct constant volume, and supply/exhaust matching application; and
implement the selected application such that the building equipment is controlled according to the selected application; and
a user interface including a plurality of dip switches configured to facilitate user selection of the one of the plurality of predefined, selectable-applications by manually engaging with one or more of the plurality of dip switches associated with the one of the plurality of predefined, selectable-applications.

2. The variable air volume controller of claim 1, wherein the building equipment includes heating, ventilation, and air conditioning components.

3. The variable air volume controller of claim 1, wherein the external device includes at least one of a mobile device and a balancing tool.

4. The variable air volume controller of claim 1, wherein each of the plurality of predefined, selectable-applications is focused on a specific implementation for the building equipment.

5. The variable air volume controller of claim 1, wherein the variable air volume controller is configurable and not fully-programmable.

6. The variable air volume controller of claim 1, wherein the processing circuit is configured to store metadata for the plurality of predefined, selectable-applications in a shared location.

7. The variable air volume controller of claim 1, wherein the processing circuit is configured to detect the building equipment coupled therewith, and wherein the selection of the one of the plurality of predefined, selectable-applications is autonomously determined by the processing circuit based on the building equipment detected.

8. The variable air volume controller of claim 1, wherein the plurality of predefined, selectable-applications comprise three or more of the single duct—cooling only, single duct with hot water reheat, single duct with electric staged reheat, single duct with hot water reheat & supplemental heat, series fan with hot water reheat, parallel fan with hot water reheat, series fan with hot water reheat & supplemental heat, parallel fan with hot water reheat & supplemental heat, series fan with electric staged reheat, parallel fan with electric staged reheat, series fan no heat, parallel fan no heat, series fan with remote electronically controlled motor, series fan with remote electronically controlled motor & hot water reheat, series fan with remote electronically controlled motor, hot water reheat & supplemental heat, series fan with remote electronically controlled motor & electric reheat, single duct with silicon controlled rectifier electric reheat, series fan with silicon controlled rectifier electric reheat, series fan with remote electronically controlled motor & silicon controlled rectifier electric reheat, parallel fan with silicon controlled rectifier electric reheat, dual duct with mixing, dual duct constant volume, and supply/exhaust matching application.

9. The variable air volume controller of claim 1, wherein the plurality of predefined, selectable-applications comprise a majority of the single duct—cooling only, single duct with hot water reheat, single duct with electric staged reheat, single duct with hot water reheat & supplemental heat, series fan with hot water reheat, parallel fan with hot water reheat, series fan with hot water reheat & supplemental heat, parallel fan with hot water reheat & supplemental heat, series fan with electric staged reheat, parallel fan with electric staged reheat, series fan no heat, parallel fan no heat, series fan with remote electronically controlled motor, series fan with remote electronically controlled motor & hot water reheat, series fan with remote electronically controlled motor, hot water reheat & supplemental heat, series fan with remote electronically controlled motor & electric reheat, single duct with silicon controlled rectifier electric reheat, series fan with silicon controlled rectifier electric reheat, series fan with remote electronically controlled motor & silicon controlled rectifier electric reheat, parallel fan with silicon controlled rectifier electric reheat, dual duct with mixing, dual duct constant volume, and supply/exhaust matching application.

10. A building management system, comprising:
a controller configured to couple to building equipment, the controller configured to:
store a plurality of predefined, selectable-applications;
receive a selection of one of the plurality of predefined, selectable-applications, wherein the plurality of predefined, selectable-applications comprise at least two of a single duct—cooling only, single duct with hot water reheat, single duct with electric staged reheat, single duct with hot water reheat & supplemental heat, series fan with hot water reheat, parallel fan with hot water reheat, series fan with hot water reheat & supplemental heat, parallel fan with hot water reheat & supplemental heat, series fan with electric staged reheat, parallel fan with electric staged reheat, series fan no heat, parallel fan no heat, series fan with remote electronically controlled motor, series fan with remote electronically controlled motor & hot water reheat, series fan with remote electronically controlled motor, hot water reheat & supplemental heat, series fan with remote electronically controlled motor & electric reheat, single duct with silicon controlled rectifier electric reheat, series fan with silicon controlled rectifier electric reheat, series fan with remote electronically controlled motor & silicon controlled rectifier electric reheat, parallel fan with silicon controlled rectifier electric reheat, dual duct with mixing, dual duct constant volume, lighting, and supply/exhaust matching or damper supply box application; and implement the selected application such that the building equipment is controlled according to the selected application;

wherein the controller includes a user interface including a plurality of dip switches configured to facilitate user selection of the one of the plurality of predefined, selectable-applications by manually engaging with one or more of the plurality of dip switches associated with the one of the plurality of predefined, selectable-applications.

11. The building management system of claim 10, wherein the building equipment includes heating, ventilation, and air conditioning components, and wherein the controller is configured as a variable air volume controller.

12. The building management system of claim 10, wherein each of the plurality of predefined, selectable-applications is focused on a specific implementation for the building equipment.

13. The building management system of claim 10, wherein the controller is configurable and not fully-programmable.

14. The building management system of claim 10, wherein the controller is configured to store metadata for the plurality of predefined, selectable-applications in a shared location.

15. A variable air volume controller, comprising:
a communications interface configured to facilitate communication with at least one of an external device and building equipment;
a processing circuit configured to:
store a super-application including a plurality of sub-applications; and
activate one or more of the plurality of sub-applications, wherein the plurality of sub-applications comprise at least two of a single duct—cooling only, single duct with hot water reheat, single duct with electric staged reheat, single duct with hot water reheat & supplemental heat, series fan with hot water reheat, parallel fan with hot water reheat, series fan with hot water reheat & supplemental heat, parallel fan with hot water reheat & supplemental heat, series fan with electric staged reheat, parallel fan with electric staged reheat, series fan no heat, parallel fan no heat, series fan with remote electronically controlled motor, series fan with remote electronically controlled motor & hot water reheat, series fan with remote electronically controlled motor, hot water reheat & supplemental heat, series fan with remote electronically controlled motor & electric reheat, single duct with silicon controlled rectifier electric reheat, series fan with silicon controlled rectifier electric reheat, series fan with remote electronically controlled motor & silicon controlled rectifier electric reheat, parallel fan with silicon controlled rectifier electric reheat, dual duct with mixing, dual duct constant volume, and supply/exhaust matching application; and a user interface including a plurality of dip switches configured to facilitate user activation of the one or more of the plurality of sub-applications by manually engaging with one or more of the plurality of dip switches associated with the one or more of the plurality of sub-applications.

16. The variable air volume controller of claim 15, wherein each of the plurality of sub-applications is focused on a specific implementation for the building equipment.

17. The variable air volume controller of claim 15, wherein at least one of the plurality of sub-applications does not apply to the building equipment connected to the variable air volume controller such that the at least one of the plurality of sub-applications remains deactivated within the super-application.

* * * * *